E. A. HAWTHORNE.
LAMP MOUNTING.
APPLICATION FILED JULY 14, 1913.
1,090,984.
Patented Mar. 24, 1914.
2 SHEETS—SHEET 2.
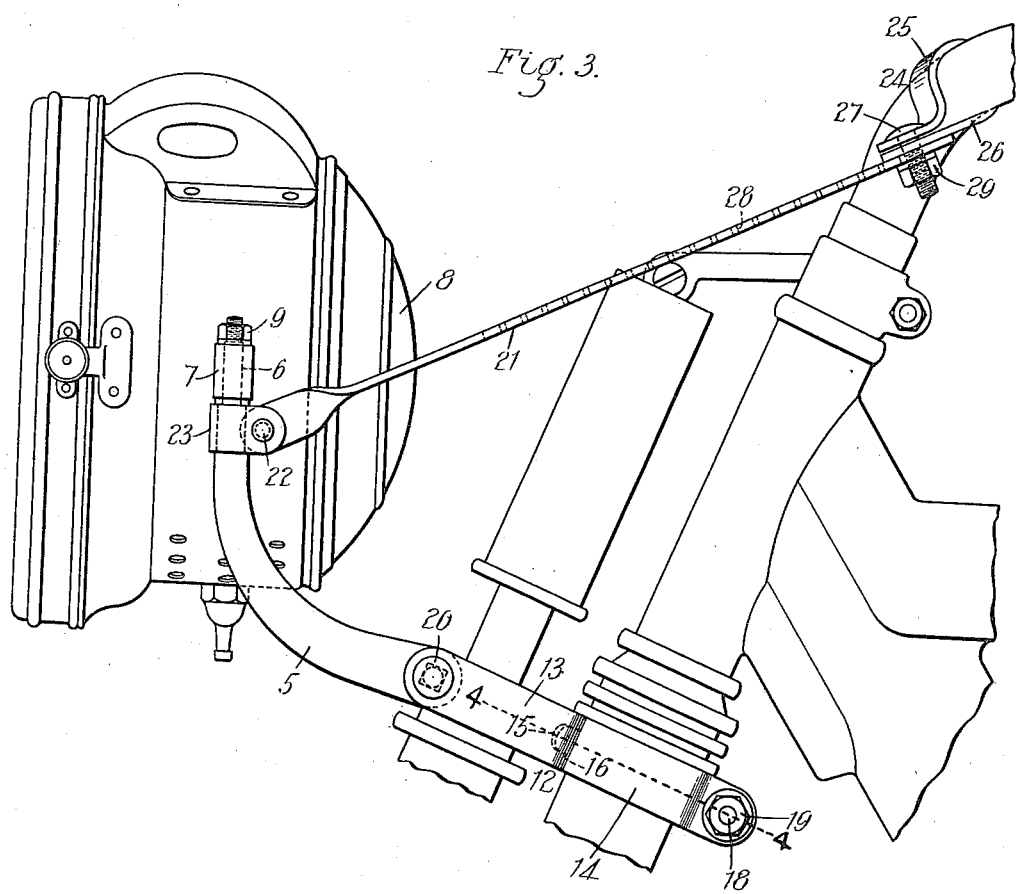
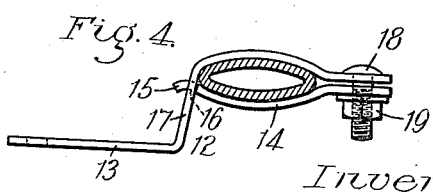
Witnesses.
Franklin E. Low.
Carl L. Choate.
Inventor:
Ellsworth A. Hawthorne
by Emery, Booth, Janney & Varney
Attys.

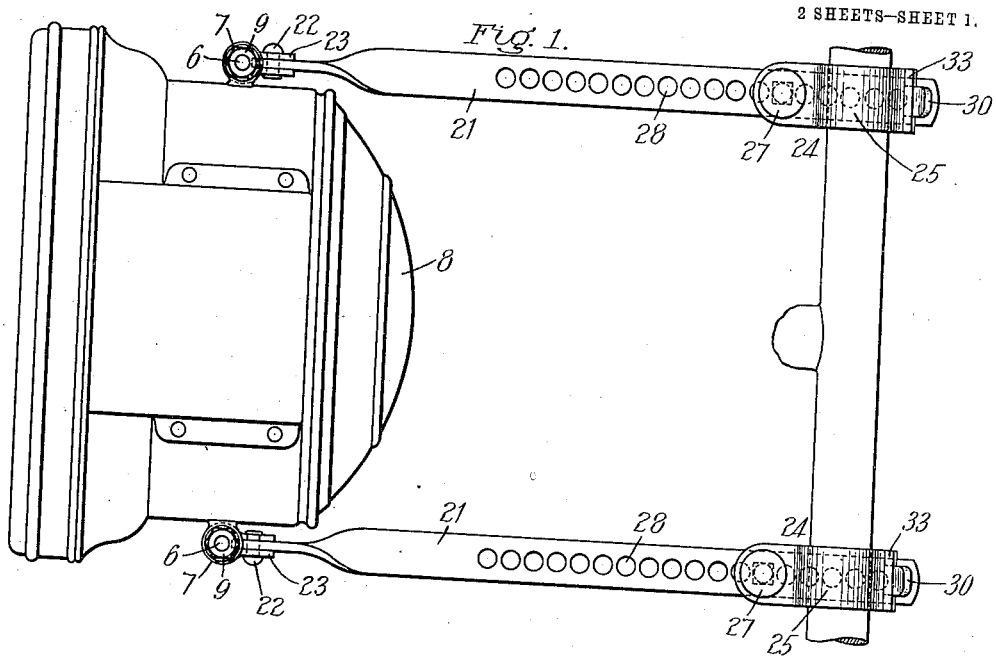
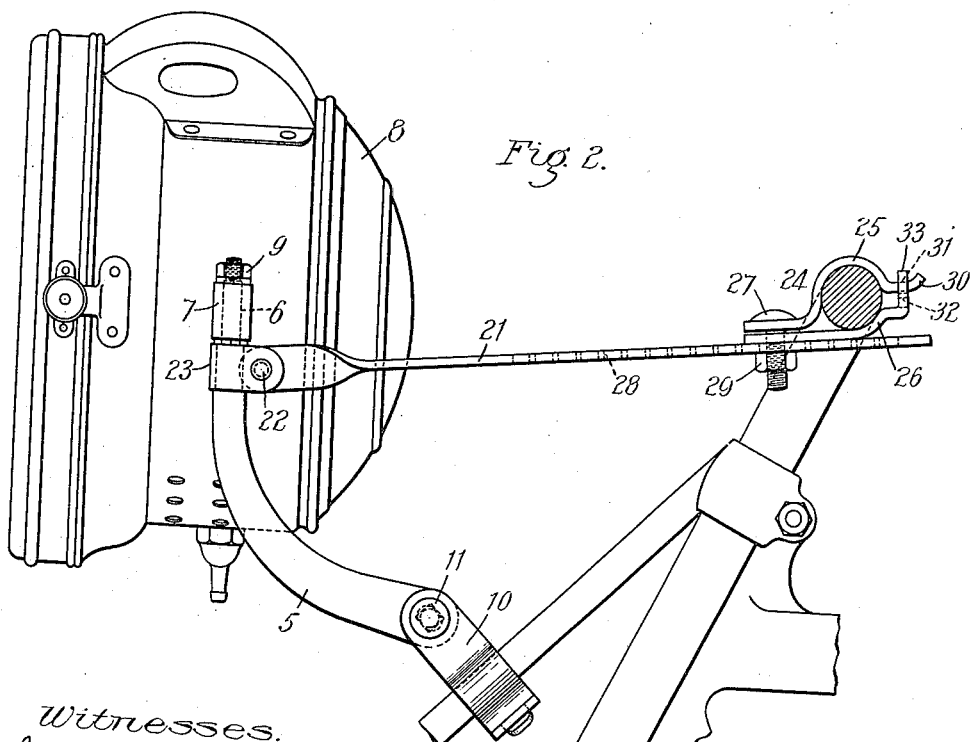

UNITED STATES PATENT OFFICE.

ELLSWORTH A. HAWTHORNE, OF BRIDGEPORT, CONNECTICUT.

LAMP-MOUNTING.

1,090,984.  Specification of Letters Patent.  Patented Mar. 24, 1914.

Application filed July 14, 1913. Serial No. 778,822.

*To all whom it may concern:*

Be it known that I, ELLSWORTH A. HAWTHORNE, a citizen of the United States, and a resident of Bridgeport, county of Fairfield, and State of Connecticut, have invented an Improvement in Lamp-Mountings, of which the following description, in connection with the accompanying drawings, is a specification, like characters on the drawings representing like parts.

This invention relates to adjustable mountings, and more especially, though not exclusively, to a lamp mounting intended to be employed for mounting a headlight upon the steering structure of a motor cycle.

My invention will be best understood by reference to the following specification, when taken in connection with the accompanying drawings of two specific embodiments thereof, while its scope will be more particularly pointed out in the appended claims.

In the drawings: Figure 1 is a plan of an adjustable lamp mounting embodying my invention; Fig. 2 is a side elevation of the same, as adapted to one form of motor cycle steering structure; Fig. 3 is a side elevation of the mounting slightly modified to adapt it to another form of motor cycle steering structure; and Fig. 4 is a plan section on line 4—4 of Fig. 3.

Referring to the drawings, and to the embodiments of my invention which I have selected for illustrative purposes, I have there shown an adjustable lamp mounting, comprising a pair of supports 5, herein in the form of arms intended to be secured in some appropriate manner to the steering fork of a motor cycle, or to its braces, according to the particular form of motor cycle to which the mounting is to be attached. These arms are preferably pivotally mounted on brackets, which will presently be described. The lamp-supporting arms extend forwardly and upwardly, and are provided at their upper terminal portions with reduced shanks 6, to receive lugs 7 appropriately formed on, or secured to, a lamp 8 of any suitable character. These lugs rest upon shoulders formed upon their respective supporting arms, and are secured in place by any appropriate means, as for example nuts 9, threaded onto the upper ends of the shanks 6.

In adapting a lamp bracket of this character to the steering structure of a cycle, various conditions have to be met in making the necessary adjustments. For example, in some motor cycles, the steering structure comprises a pair of diagonal braces extending downwardly and forwardly from the upper portion of the steering head, while in other forms, there is placed at the front of the steering head a fork cushioning device, comprising a piston and cylinder, the latter containing a spring serving to absorb the road shocks. Fig. 2 shows a portion of the steering structure of the first-mentioned type, while Fig. 3 shows a portion of the steering structure of the second-mentioned type. Referring to the form shown in Fig. 2, the steering attachments 5 are mounted upon clamps 10, embracing the fork braces just referred to, and provided with clamping bolts 11, which serve as pivots for the arms, and also as a means for securing the clamps to the braces, while permitting the arms to be adjusted about the axes of the braces, as well as about the axes of the bolts 11.

Referring to the form shown in Figs. 3 and 4, each of the arms 5 is supported upon a clamp 12, comprising two members 13 and 14, the latter provided with a tongue 15 projecting through a slot 16 provided in an offset portion 17 of the member 13. The members 13 and 14 are adapted to embrace one of the side members of the steering fork, and may be clamped to the latter by a bolt 18 passing through both clamp members, and provided with a nut 19. Each supporting arm is herein adjustably mounted upon its respective clamp by a bolt 20 passing through the latter, and through the arm, and serving as a pivot about which the arm may be angularly adjusted in a vertical plane.

As a means for adjustably securing the supporting arms in the desired angular position, the arms are herein provided with bracing means comprising a pair of braces 21, and connecting the arms to the usual transverse handle bar of the steering structure. Herein the forward ends of the braces are pivoted at 22 to a pair of collars 23 encircling the upper portions of the supporting arms directly below the lugs of the lamp, the arrangement being such that the braces may be angularly adjusted about the vertical axes of the supporting arms, and about the horizontal axes of the pivots 22.

As a means for securing the braces in a plurality of predetermined positions of lengthwise adjustment with respect to the handle bar, the braces are secured to clamps 24, each comprising two clamping members 25 and 26, through which a bolt 27 extends into one of a longitudinal series of perforations 28 provided in each brace, the bolt being provided with a nut 29. The brace 21 may be adjusted about the axis of the bolt 27, as well as about the axis of the handle bar, these two axes being approximately at right angles to each other. By simply removing the bolts and moving the braces lengthwise, the lamp-supporting arms may be placed in any desired position of angular adjustment within the range of the braces, and the latter may then be secured by inserting the bolt of each brace in the appropriate perforation in the latter. Herein the clamp member 25 is provided with a tongue 30, which may be placed in either of two slots 31 and 32, in a lug 33, formed on the clamp member 26, thereby permitting the clamp to be adjusted to fit handle bars of different diameters. The clamping bolt 27 may also serve as a further means of adjustment.

A great range of adjustability of the mounting is well illustrated in the drawings, which show the same adapted to two widely differing forms of motor cycle steering structures, it being evident that the connections between the several parts of the mountings is such that they may be adjusted to various angular positions with relation to one another, and may be secured to steering structures of different types and proportions. The axis of the lamp may be inclined to whatever degree is necessary to cause the beam of light to be directed at the proper height, by simply shifting the braces 21 to whatever extent is necessary to vary the angular position of the lamp in a vertical plane, in an obvious manner.

While I have herein shown and described two specific embodiments of my invention for illustrative purposes, and have disclosed and discussed in detail the construction and arrangement incidental to two specific applications thereof, it is to be understood that the invention is limited neither to the mere details or relative arrangement of parts, nor to its specific embodiments herein shown, but that extensive deviations from the illustrated forms or embodiments of the invention may be made without departing from the principles thereof.

Having thus described my invention, what I claim and desire by Letters Patent to procure is:—

1. A mounting of the class described comprising, in combination, a clamp, a support pivotally mounted on said clamp, a second clamp, a brace pivotally connected to said support and provided with a longitudinal series of perforations, and fastening means extending from said second clamp through one of said perforations.

2. A mounting of the class described comprising, in combination, a clamp, a support pivotally mounted on said clamp, a second clamp comprising a pair of clamping members, a brace pivotally connected to said support and provided with a longitudinal series of perforations, and fastening means extending through said clamping members and through one of said perforations.

3. A mounting of the class described comprising, in combination, a support, a supporting member pivotally mounted on said support, and means to rigidly brace said supporting member including a brace member pivotally connected to said supporting member and provided with a longitudinal series of perforations, and clamping means including a fastening member passing through one of said perforations.

4. A mounting of the class described comprising, in combination, a support, a supporting member pivotally mounted on said support, a brace for said supporting member, and means for rigidly securing said brace in a plurality of predetermined positions of lengthwise adjustment.

5. A mounting of the class described comprising, in combination, a support, a supporting member pivotally mounted on said support, a brace attached at one end to said supporting member, and means for rigidly securing said supporting member including a device interlocking with said brace to secure the same in a plurality of positions of longitudinal adjustment.

6. A mounting of the class described comprising, in combination, a supporting arm, means for attaching said arm to a suitable support and permitting said arm to be angularly adjusted about either of two axes at right angles to each other, a brace member, means for attaching said brace member to said supporting arm and permitting said brace member to be angularly adjusted about either of two axes at right angles to each other, and means for attaching said brace member to said support and permitting said brace member to be longitudinally adjusted and angularly adjusted about either of two axes at right angles to each other.

In testimony whereof I have signed my name to this specification, in the presence of two subscribing witnesses.

ELLSWORTH A. HAWTHORNE.

Witnesses:
E. HORACE HAWTHORNE,
E. STEWART HAWTHORNE.